United States Patent [19]

Paradis

[11] Patent Number: 4,754,529

[45] Date of Patent: Jul. 5, 1988

[54] BUNDLING OF OBJECTS

[75] Inventor: Joseph R. Paradis, Holden, Mass.

[73] Assignee: Dennison Manufacturing Company, Framingham, Mass.

[21] Appl. No.: 296,702

[22] Filed: Aug. 27, 1981

Related U.S. Application Data

[63] Continuation-in-part of Ser. No. 167,890, Jul. 14, 1980.

[51] Int. Cl.$^4$ .............................................. B65D 63/10
[52] U.S. Cl. .................................. 24/16 PB; 24/30.5 P
[58] Field of Search ............... 24/16 PB, 17 AP, 30.5, 24/206 A; 248/74.5, 74.6, 74.4

[56] References Cited

U.S. PATENT DOCUMENTS

| | | | |
|---|---|---|---|
| 3,906,593 | 9/1975 | Caveney et al. | 24/16 PB |
| 3,924,299 | 12/1975 | McCormick | 24/16 PB |
| 4,001,898 | 1/1977 | Caveney | 24/16 PB |
| 4,003,106 | 1/1977 | Schumacher et al. | 24/16 PB |
| 4,092,765 | 6/1978 | Joyce | 24/16 PB |
| 4,135,749 | 1/1979 | Caveney et al. | 24/16 PB |
| 4,136,148 | 1/1979 | Joyce | 24/16 PB |
| 4,137,606 | 2/1979 | Wood | 24/16 PB |

Primary Examiner—Paul J. Hirsch
Attorney, Agent, or Firm—George E. Kersey

[57] ABSTRACT

Bundling of objects using a harnessing device with a locking head and a strap with teeth that are controlled by stretching. The locking head contains a pawl or tang that engages the teeth of the strap by wedging. One or more wedging teeth are desirably located on the locking tang as well. A further tooth to promote locking is desirably included in the locking head. The strap is advantageously molded of stretch reorientable material which is subsequently stretched to control the profile of the teeth which are engaged by the locking tang and head. The teeth are spaced on the strap to permit use of the teeth near the head for the harnessing of small bundles. The pawl is provided with specified pivot points for both the insertion and loading of the strap in the head.

16 Claims, 5 Drawing Sheets

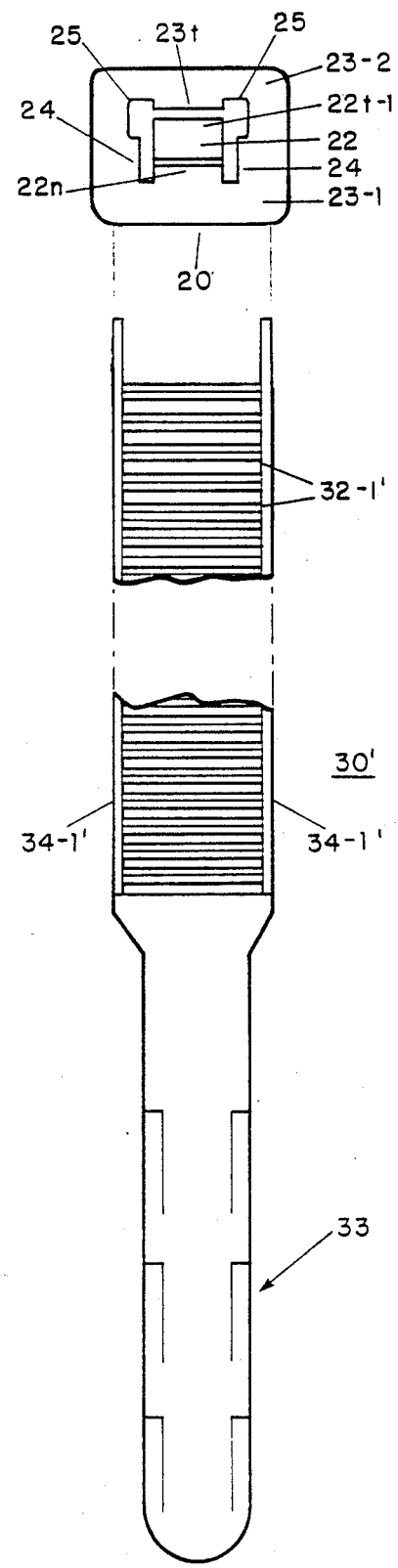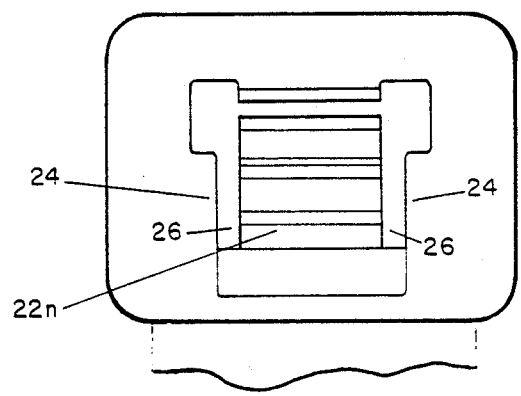

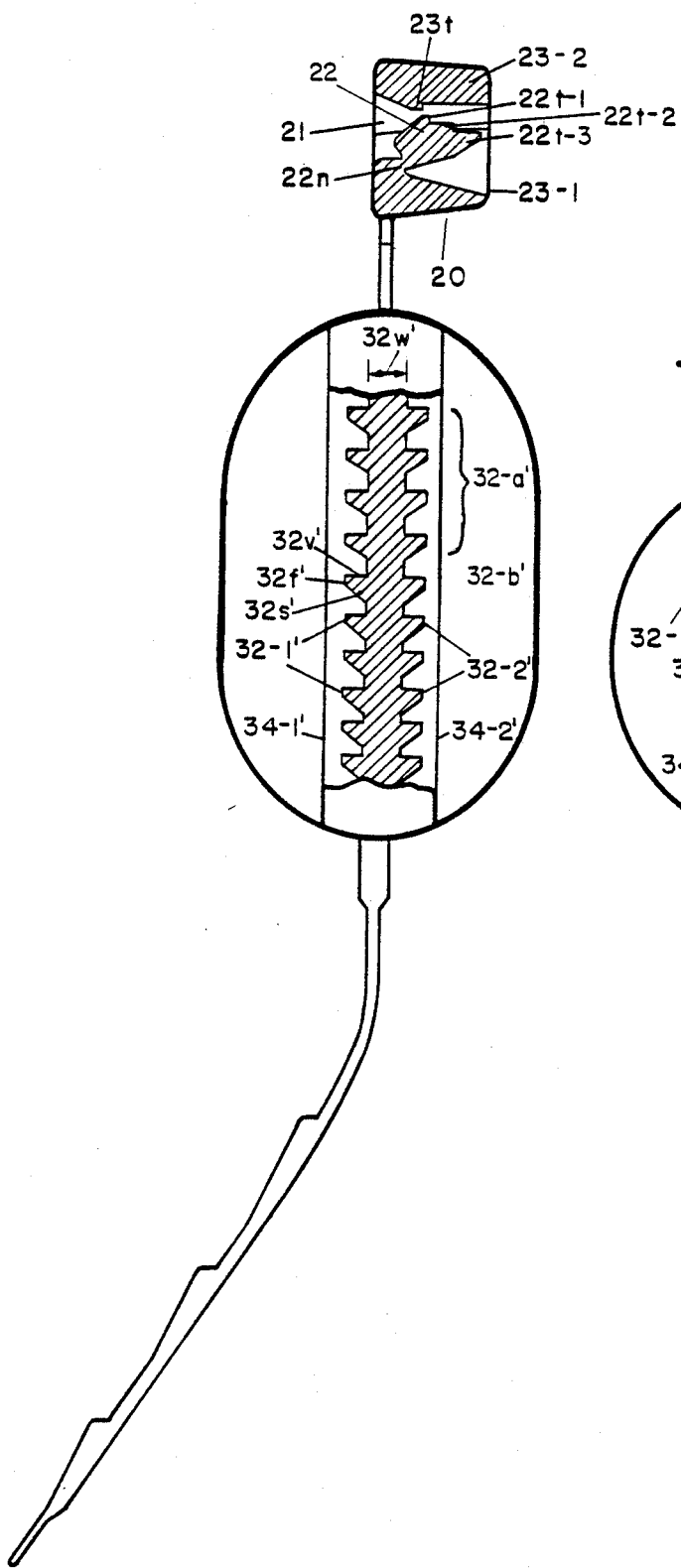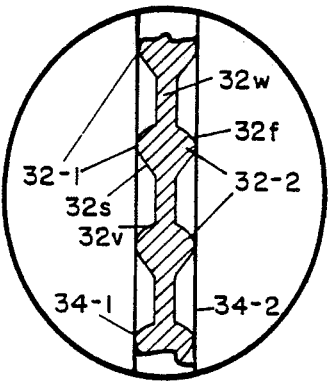

BUNDLING OF OBJECTS

BACKGROUND OF THE INVENTION

This is a continuation-in-part of my prior application Ser. No. 167,890 filed July 14, 1980. The invention relates to the harnessing of the items and more particularly to the realization of efficient, low-cost, high strength harnessing devices which are easy to use.

Harnessing devices are widely used for the bundling of objects. Such devices are typically formed with a serrated strap that is fitted to an apertured head containing an internal pawl or locking tang that engages the serrations of the strap. Other harnessing devices are in the form of an apertured strap fitted to a buckle-like head, with a tongue that enters the apertures of the strap.

Harnessing devices with serrated straps have the disadvantage of being only as secure as their pawls. Where the items that are harnessed are heavy or are subjected to rough handling, the items can become accidentally released, for example, by pawl failure. Attempts have been made to strengthen serrated strap devices, without achieving the desired end result of providing enhanced security against accidental release of harnessed items. Similar objectives apply to harnessing devices with buckle-like heads. In these devices, a tongue which enters the strap apertures rests against the head of the buckle near its opening and is deflected by the strap. The tongue is typically a cantilever attachment to the buckle-like head, which is inadequate in most harnessing applications.

Representative harnessing devices are disclosed in U.S. Pat. Nos. 515,747; 2,977,145; 3,030,131; 3,102,311; 3,106,028; 3,127,648; 3,140,139; 3,189,961; 3,339,246; 3,368,247; 3,486,201; 3,457,598; 3,537,146; Re.26,492; 3,542,321; 3,588,962; 3,598,442; 3,605,199; 3,627,300; 3,654,669; 3,660,869; 3,731,347; 3,766,608; 3,816,878; 3,840,246; 3,872,547; 3,887,965; 3,906,593; 3,908,233; 3,949,449; 3,952,373; 3,965,538; 3,991,444; 3,996,646; 4,001,898; 4,003,106; 4,093,288; 4,128,919; 4,135,749; 4,136,148; and 4,137,606.

In order to avoid and overcome many of the difficulties associated with the foregoing kinds of harnessing devices, ladder straps and associated locking tangs have been developed of the kind disclosed in U.S. Pat. No. 3,766,608, which issued Oct. 23, 1973. The ladder strap device represents a significant improvement over the serrated strap and other harnessing devices. It can accomplish substantially the same functions as a serrated strap device at a considerably lower cost. The ladder strap can be produced with a significant saving in material and can be strengthened by stretching.

Notwithstanding its advantages, however, the ladder strap is not suitable for every bundling application. The precision with which the ladder strap tie can be adjusted is controlled by the spacing between its rungs. Since it is advantageous for the ladder tie to be stretched in order to reorient its molecules, the stretching often produces a separation of subsequent rungs which reduces the precision with which such a tie can be used in the bundling of objects. In addition the ladder tie typically makes use of a deflectable pawl which extends between adjoining rungs. The locking of the pawl with the strap results in the application of substantially shear pressures to the pawl.

Accordingly, it is an object of the invention to provide for the secure harnessing of items. A related object is to achieve secure harnessing without the need for a complex harness configuration. Other related objects are to achieve a cost-effective, light-weight, material saving, and precisely adjustable device.

A further object of the invention is to provide a harnessing device which is efficient, accurate and rapid to use. A related object is to provide a suitable structure without an undue increase in bulk. Another related object is to overcome the difficulties associated with harnessing devices. Still another related object is to produce a structure that has sufficient mass for efficient use while being sufficiently light in weight so as not to interfere with harnessing operations.

A further object of the invention is to achieve secure anchoring of the strap in the head.

Still another object of the invention is to achieve precision control over the strap configuration in order to realize precise bundling of objects.

SUMMARY OF THE INVENTION

In accomplishing the foregoing and related objects the invention provides a harnessing device with a locking head and an attached strap. The device is fabricated by molding. At least one side of the strap desirably includes a set of teeth with a profile that is controlled by stretching. When the strap is unstretched it can be locked in the head by virtue of the profile of the teeth on the strap, or the configuration of a locking pawl in the head.

In accordance with one aspect of the invention the head contains a locking pawl for wedging the strap in the head. The pawl is desirably deflectable but can be stationary when appropriately proportioned.

In accordance with another aspect of the invention the pawl includes a tooth that is engageable with the strap. A plurality of teeth are desirably located on the pawl. At least one pawl tooth is used for setting the strap with respect to the head and at least another pawl tooth is used for effecting the desired wedging of the strap within the head. The use of a plurality of wedging teeth is particularly desirable since this distributes the load among the wedging teeth.

In one advantageous embodiment of the invention the first wedging tooth occupies an intermediate position on the portion of the pawl facing the entry channel for the strap. A second wedging tooth is provided at the end of the pawl. The pawl advantageously includes a ramp that extends from the channel entry position of the head to the first pawl tooth.

The setting tooth or teeth on the pawl preferably acts to achieve pivoting or pawl rotation during strap insertion. The wedging teeth preferably are not subjected to any significant load during strap insertion. This reduces the possibility of damage to the wedging teeth.

In accordance with still another aspect of the invention the pawl is desirably secured to the locking head by a hinged neck. The hinged neck advantageously is at an intermediate position on the lower portion of the pawl to provide a locking ledge with respect to the head for both forward and reverse thrust motions of the strap. The hinged neck is provided with specified and distinctive pivot points for respective strap insertion and loading.

The pivot point for strap insertion is on a surface of the neck facing the channel for strap insertion. Conversely the pivot point for strap loading is on the opposite side of the hinged neck. Each of the pivot points is defined by the intersection of a linear segment and a curvilinear segment. During loading the operational pivot point is floating in the sense that as rotation takes place about the pivot point, the latter moved towards the front of the head and downwardly.

In accordance with yet another aspect of the invention the channel in the locking head for the entry of the strap advantageously includes side ledges that facilitate guidance of the strap in the channel. The locking head also can include in the upper wall of its channel, at least one tooth for engagement with the strap to enhance the locking effect that is achieved using the locking pawl.

In accordance with a further aspect of the invention the pawl includes at least one tooth with a trailing edge that is at less than a right angle to the principal axis of the channel in the head. The trailing ramp of the pawl is advantageously at an acute angle of declination with respect to the principal axis of the head when the pawl is in its equilibrium rest position.

In accordance with a still further aspect of the invention the harnessing device includes a pawl connected in the head channel by a hinged neck at an intermediate lower profile position. The associated strap of the device does not need to be stretched, but advantageously has teeth with a profile that is controlled by stretching. The hinged neck is desirably near the lower mid-position of the pawl to provide a locking ledge for both forward and reverse thrust motions of the strap. The hinge configuration preferably provides maximum flexibility and suitable strength, with the remaining pawl design and related structure providing the necessary strength.

In accordance with still another aspect of the invention the strap contains a double set of teeth, one on each side of the strap, each with profile that can be controlled by stretching. It is desirable for the teeth to be symmetrical with respect to the principal axis of the strap, and for the strap to include side rails at its edges. Although the side rails can be omitted from one or both sides of the strap, the side rails serve an important function in molding of guiding the molten plastic to suitable portions of the strap. This is particularly important where the finally stretched strap will have thin webbed sections between adjoining teeth.

In accordance with an additional aspect of the invention, when one or more side rails are included at the edges of a stretchable strap, they have a higher profile than the teeth prior to stretching. It is desirable for the strap to be stretched so that the side rails become tangential to the peaks of the teeth after stretching.

In accordance with still another aspect of the invention the teeth of the strap have a curved trailing edge which is desirably produced by stretching a trailing edge that is substantially at a right angle with respect to the principal axis of the strap. It is also desirable for the teeth of the strap to have inclined ramp leading edges. Successive ones of the teeth are interconnected by a web which is narrower than the maximum height of the teeth. The connecting web advantageously has a substantially uniform thickness. It is particularly desirable for the web to lie along the central axis of the strap and to be symmetrically positioned.

In accordance with yet another aspect of the invention the harnessing device is fabricated by a molding operation in which teeth are provided on opposite sides of the strap. The molding can also provide for the formation of side rails at one or more edges of the strap, with a higher profile than the associated teeth. The strap can then be subjected to a stretching step to reduce the profile of the rails relative to the teeth. In an advantageous embodiment the strap is stretched until the profile of the side rails is tangential to the peak of at least one tooth.

In accordance with a still further aspect of the invention the strap is molded with teeth having a partial flat that is parallel to the axis of the strap and is converted to a rounded profile by stretching. The partial flat serves the important role of allowing the strap to be realized with teeth of substantially uniform height. The molding step desirably includes provision for molding of the strap with successive teeth connected by a web which is narrower than the maximum height of the teeth. Molding can be followed by the step of stretching the strap to elongate the web that interconnects successive ones of the teeth. When stretching during production is accomplished, strap flexibility is readily achieved during use. Thus, the strap will stretch to a degree when wrapped around a bundle, and when the wrapping force is released, the stretching strap will retract thereby more effectively achieving the locking action characteristic of the design.

The strap is used to encircle items to be bundled and desirably extends at an angle from the locking head with respect to the principal axis of the guide channel in the head. The profile of the teeth on the strap is shaped to reduce the force required for insertion of the strap in the head and to limit the tendency of thrust applied to the head to fracture the pawl.

In accordance with still another aspect of the invention, the teeth located on the strap near the head are spaced so that the stretched strap is operative even with respect to teeth that lie at or near the transition between the head and the toothed portion of the strap. For that purpose the spacing of the initially positioned teeth is increased above that of the remaining teeth on the strap.

In one embodiment of the invention the intertooth interval of the unstretched strap is about 0.020 of an inch, while the intertooth interval of the preliminary teeth near the end of the strap is increased by 0.005 of an inch to 0.025 inch for the preliminary teeth of the strap. The result upon stretching is an effective intertooth interval at the end portion of the strap which is substantially the same as the intertooth interval along the intermediate portion of the strap. It is to be noted that the effective intertooth interval for the teeth nearest the head is not the same as the spacing between teeth, but instead is the usable interval between teeth taking into account the curvature that occurs with the preliminary teeth on stretching.

DESCRIPTION OF THE DRAWINGS

Other aspects of the invention will become apparent after considering several illustrative embodiments taken in conjunction with the drawings in which

FIG. 2A is a plan view of the device of FIG. 1 in its extended unbundled condition before the stretching of its strap;

FIG. 2B is an enlarged fragmentary plan view of the head portion of the strap;

FIG. 3 is a side sectional view of the bundling device of FIG. 2, including an enlarged fragment showing the unstretched teeth of the strap;

FIG. 4 is a side sectional view of the strap portion of FIG. 3, after stretching, showing the control exercised over the profile by stretching;

DETAILED DESCRIPTION

Figure 1A:
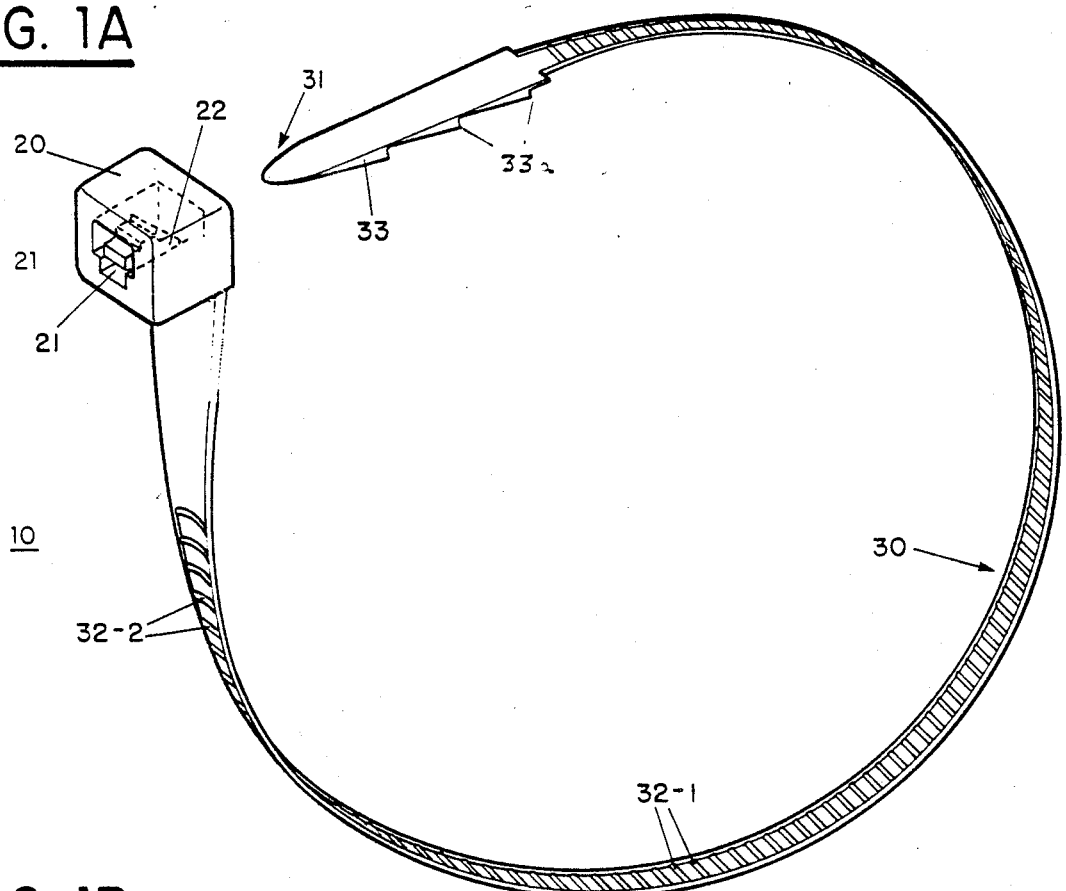
FIG. 1A is a perspective view of a bundling device in accordance with the invention.

As shown in FIG. 1, a harnessing device 10 in accordance with the invention includes a head 20 and an attached strap 30. The strap 30 is in the form of a toothed structure with a set of teeth 32-1 on one side of the strap and a mating set of teeth 32-2 on the opposite side of the strap. The free end 31 of the strap 30 includes a tail portion 33 which is insertable into a channel 21 of the head 20 to bring the strap into engagement with an internal locking tang or pawl 22.

Figure 1B:
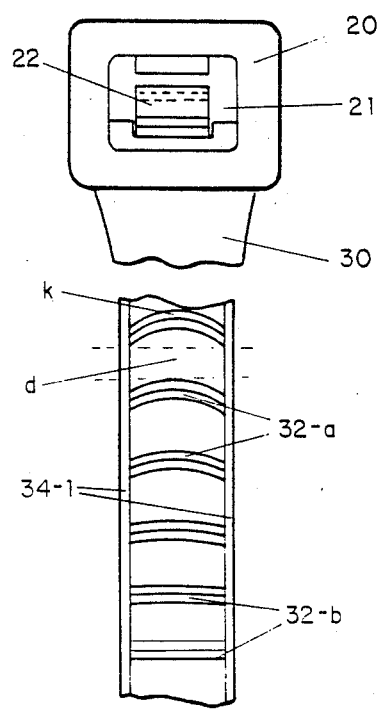
FIG. 1B is an enlarged plan view of a fragmentary portion of the head region of the strap of FIG. 1A in its stretched condition illustrating the spacing of the initial teeth on the strap to permit tight bundling.
Figure 1C:
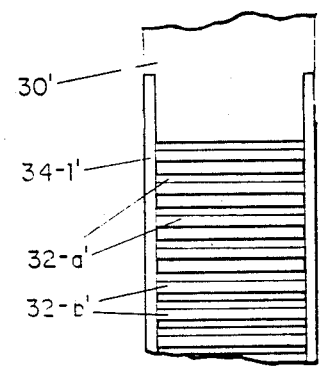
FIG. 1C is a fragment of an unstretched strap corresponding to FIG. 1B showing the intertooth interval of the preliminary teeth as compared with the intertooth interval of the remaining teeth on the strap.

The preliminary teeth 32-a shown in detail in FIG. 1B are provided with a deliberate curvature k so that the working interval d for the preliminary teeth 32-a is the same as for the rectilinear teeth 32-b on the remaining portion of the strap. This result is achieved as indicated in FIG. 1C by providing a greater space between the unstretched teeth 32-a' than for the remaining teeth 32-b'. Since the teeth of the set 32-a' nearest the head are subjected to stretching forces along the strap which are greatest in the vicinity of the side rails 34-1' and decrease towards the center of the strap, as a consequence of the mass of the tab located between the teeth and the head, the curvature k illustrated in FIG. 1B results upon stretching of the strap. In an illustrative embodiment of the invention the first four preliminary unstretched teeth 32-a' have an intertooth interval of 0.025 inch as compared with an intertooth interval of 0.020 inch for the remaining unstretched teeth 32-b'. It has been discovered that in the stretching process the preliminary teeth 32-a' near the head are subjected to greater stretching along the side rails 34-1 and 34-2 than along the central portion of the strap 30. The result is the curved bow with the curvature k shown in FIG. 1B. It will be appreciated that the number of teeth that are subjected to irregular stretching depends upon the transition from the head to the teeth of the strap as shown in FIG. 1B. In some situations it is desirable to graduate the spacing among the preliminary teeth by, for example providing an interval of 0.025 inch for the first two teeth, followed by a successively reduced interval, e.g. 0.024, 0.023, 0.022; 0.021 and finally a constant interval of 0.020 for the remaining teeth.

It is to be noted further that the tail portion 33 as shown in FIG. 1A includes a plurality of stretching anchors illustratively three in number designated 33a which serve as anchor points for the strap with respect to the head during stretching. The stretching anchors 33a are of the same width as the rails and are configured to prevent any inadvertent deflection of the pawl upon insertion of the strap into the channel of the head. Only the stretching anchors on one side of the strap are visible in FIG. 1A; it will be understood that a similar set, symmetrically positioned, is disposed on the other side of the strap.

As indicated in FIGS. 2A and 3 the pawl 22 is desirably joined to a lower wall 23-1 of the head 20 by a neck 22n. The neck 22n is connected to the pawl 22 at an intermediate position to reduce any shear tendency by the pawl during the application of either a forward or reverse thrust to it. This is in part by virtue of the bulges of the pawl 22 extending beyond either side of the neck 22n.

Referring in particular to FIG. 2A, it will be noted that the neck 22n includes side surfaces positioned adjacent side wall shoulder 24. In accordance with a preferred form of the invention, the side surfaces are disconnected from the shoulders to provide maximum flexibility for the pawl as indicated in detail in FIG. 2B. While this would appear to sacrifice pawl strength in that there is a reduced cross section of material connecting the pawl to the head this is not in fact the case. Pawl strength is not of significant concern during the insertion of the strap into the head, and in fact the preferred design of FIG. 2B helps to reduce the minimum insertion force. During loading, upon strap release, the support afforded by the wedging teeth provide a sufficiently strong coupling of the strap to the head that there is little danger of pawl failure.

As a result, the deliberate disconnection of the pawl from the side wall shoulders 24 at positions 26 as shown in detail in FIG. 2B enhances pawl flexibility without any detrimental reduction in pawl strength.

The teeth 22t-1, 22t-2, and 22t-3, which serve respective "setting" and "wedging" functions are shown in detail in FIG. 3 on the upper profile of the pawl 22. The setting tooth 22t-1 is trapezoidal. It has a leading point formed by the intersection of a ramp surface with a flat that is desirably parallel to the axis of insertion of the strap. The trailing edge of the tooth 22t-1 is substantially vertical. The tooth 22t-1 serves to properly position the strap, after insertion, with respect to the upper wall 23-2 of the head 20.

Following the setting tooth 22t-1 is the first wedging tooth 22t-2 which lies at an intermediate position of the pawl 22 before a second wedging tooth 22t-2 at the trailing edge of the pawl. The first wedging tooth 22t-2 has a tip formed by an intermediate flat of the pawl and a trailing edge which is at an angle less than 90° when the pawl is in equilibrium, i.e. with no strap inserted. The second wedging tooth 22t-3 at the trailing edge of the pawl is at the intersection of a trailing flat or ramp of the pawl, which in equilibrium slopes downwardly from the axis of insertion for the strap. The trailing edge of the second wedging tooth 22t-3 is also at an equilibrium angle less than 90°, with the angle for the second wedging tooth 22t-3 being less than or the first wedging tooth 22t-2. It is the wedging teeth 22t-2 and 22t-3 which provide the desired wedging function by which the strap 30 is properly located in the head 20.

The opposite wall 23-2 of the head 20 includes a locking tooth 23t. This tooth has a trapezoidal profile similar to that of the setting tooth 22t-1 on the pawl 20, except that it is stationary, Accordingly, the locking tooth 23t has a leading point formed by the intersection of a downwardly inclined ramp and a flat, and a trailing point formed by the intersection of the flat with a trailing edge that is perpendicular to the axis of insertion of the strap 31.

In use, the harnessing device 10 is looped about objects to be bundled, with the strap 30 assuming the initial configuration shown in FIG. 1. To complete the bundling the tail portion 33 is inserted into the channel 21 of the head 20, as explained in detail below with reference to FIGS. 5A through 5C.

In order to promote the wedging of the teeth of the strap within the head, as well as the engagement of the strap with the teeth 22t-1, 22t-2, 22t-3 and 23t, the teeth 32-1 and 32-1 are of a controlled configuration which is determined by the way in which the strap is stretched during manufacture.

The individual teeth of the unstretched strap of FIG. 3 have a prescribed profile with respect to the principal axis of the strap. There is a trailing vertical edge 32v', a flattened upper edge 32f' and a sloping leading edge 32s'. The angle of slope of the edge 32s' is desirably about 45° with respect to the principal axis of the strap 30. The flattened portion 32f' of the tooth is about ⅓ of the overall tooth depth. The height of the vertical portion 32v' is greater than approximately ½ of the width of the web 32w'. The side rails 34-1 and 34-2 extend beyond the respective sets of teeth 32-1' and 32-2' to provide a margin which is approximately the same as the height of the unstretched trailing edge 32v' with respect to the surface of the web 32-w'.

Also shown in FIG. 3 in section is a comparison of the preliminary unstretched teeth 32-a' with the remaining teeth 32-b'. As noted previously in conjunction with FIG. 1C the first four teeth of the preliminary set 32-a' have a greater spacing than the remaining teeth 32-b'. It is this facing which produces a result illustrated for the teeth 32-a as compared with the teeth 32-b in FIG. 1B.

The strap 30' molded as shown in FIG. 3 can be used with the locking head 20 is suitably modified. However, the proportions shown for the locking head 20 in FIGS. 2 and 3 are intended for accommodating the strap 30' after stretching. The result of stretching is indicated in FIG. 4, providing a reduction of the profile of the side rails 34-1 and 34-2 to be approximately tangential with the peaks of the stretched teeth 32-1 and 32-2. It is to be noted that the unstretched side rails 34-1' of FIG. 3 are significantly wider than the unstretched tooth portion of the strap. This increase in width is desirable to facilitate the filling of the mold. A significant problem that is encountered in molding is the provision of a sufficiently large cavity to fill the entire mold. The enlarged unstretched side rails 34-1' provide suitable channels for assuring the filling of the entire mold and the realization of a stretched strap with a web 34w (as indicated in FIG. 4) which imparts the desired flexibility to the strap. It will be appreciated that the control over mold filling is readily accomplished with the side rails 34-1' by increasing their lateral dimension to the extent desired for proper filling. Thus the width of the side rails can be altered to accommodate the filling of any length of strap and a corresponding change in the head to accommodate the widened side rails is made. The trailing edge 32v' of FIG. 3 becomes rounded trailing edge 32v in FIG. 4. A similar rounding effect takes place to convert the flat surface 32f' of FIG. 3 into the rounded tangential surface 32f of FIG. 4. The sloping surface 32s' of FIG. 3 is merely extended by the stretching and becomes the extended sloping surface 32s of FIG. 4. The web 32w' is reduced in width forming the stretched web 32w which extends between adjoining teeth.

The strap teeth configuration is preferably not complementary in either spacing or shape when compared with the teeth 22t of the pawl. The strap engaging edges of the respective teeth 22t-1, 22t-2, and 22t-3 are more closely spaced than corresponding points of adjacent strap teeth 32f. Moreover, the pawl teeth edges are relatively sharp when compared with the rounded teeth of the strap. In practice, the spacing of the pawl teeth comprises from 50 to 90 percent of the spacing of the strap teeth, preferably between 60 to 80 percent. It will be appreciated that the relative spacing can be varied depending upon the degree of stretching imparted to the strap.

Figure 5A:
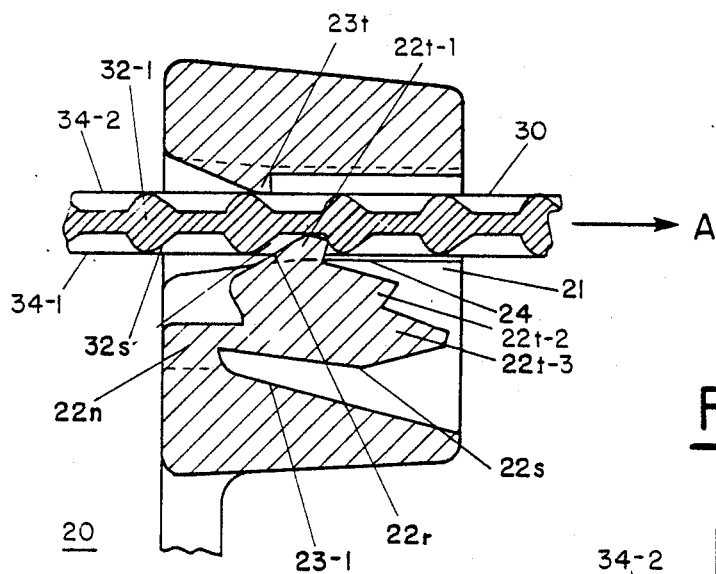
FIG. 5A is a side sectional view of the head portion of the bundling device showing its strap in the course of being inserted.
Figure 5B:
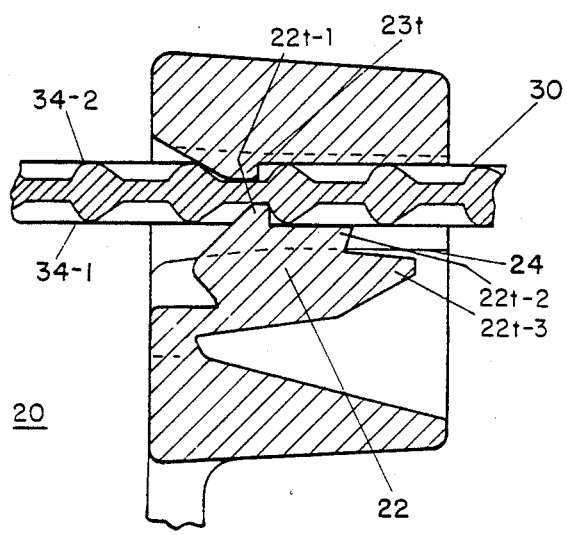
FIG. 5B is a side sectional view of the head portion of FIG. 5A showing the strap in its equilibrium condition after insertion.
Figure 5C:
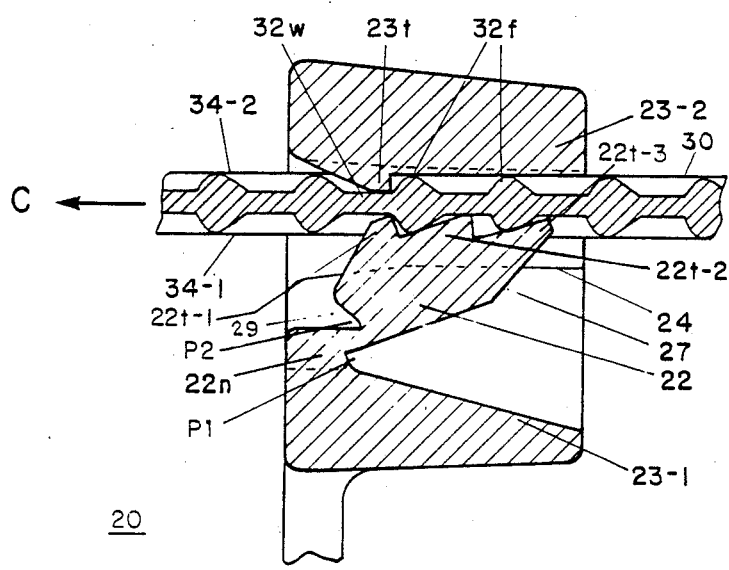
FIG. 5C is a side sectional view of the head portion of FIG. 5B showing the interrelation between the teeth of the strap and the locking pawl when reverse thrust is applied to the strap.

The consequences of inserting the stretched strap 30 into the locking head 20 are illustrated in FIGS. 5A through 5C. FIG. 5A shows the strap 30 in the course of being fed through the channel 21 in the direction indicated by the arrow A. The engagement of the sloping surface 32s of the teeth 32-1 with ramp surface 22r of the locking tang 22 causes the locking tang to pivot about its neck portion 22n so that the lower surface 22s of the pawl 22 approaches the surface of the wall 23-1. During insertion of the strap 30 the side rails 34-1 tend to be guided by the shoulders 24 of the head 20 as shown in FIG. 5A and in FIG. 2.

During strap insertion, the setting tooth 22t-1 also serves as the means for achieving pivoting or rotating of the pawl 22. As successive strap teeth 32 engage the pawl, the pivoting movement substantially prevents contact of a preceding strap tooth 32 with wedging tooth 22t-1. Accordingly, there are little or no forces applied to the wedging tooth during strap insertion whereby damage to the wedging tooth is avoided. The tooth is, therefore, exclusively used for the locking function.

When the forward motion of the strap into the locking head is terminated the locking tang 22 returns to its equilibrium position as shown in FIG. 5B. In this position the strap 30 has its outer side rails 34-2 pushed towards upper ledges 25 that straddle the internal tooth 23t in the head 20 as shown in FIG. 2. As further indicated in FIG. 5 the setting tooth 22t-1 of the pawl 22 is positioned between two of the teeth 32, while the locking tooth 23t in the head 20 is similarly positioned between corresponding upper teeth 32-2.

The first wedging tooth 22t-2 has its tip in approximate alignment with the lower surface of the side rail 34-1. The remaining wedging tooth 22t-3, when the pawl 22 is in its equilibrium position as shown in 5B, is slightly below the ledge 24. It will be seen that the ledge 24 is positioned with respect to the channel of insertion to permit a tight clearance of the head tooth 23t (FIG. 5A) in order to prevent any adverse retrograde activity with respect to the pawl while simultaneously permitting clearance of the head tooth 23t. The result as shown in FIG. 5B is that the ledge 24 is positioned well below the lower surface 34-1 of the strap 30 when the pawl 22 is in its equilibrium position with the strap inserted.

Reverse thrust is applied in the direction C as shown in FIG. 5C, as when the strap 30 inserted into the head 20 is released under load. The deflectable pawl 22 pivots in a counterclockwise direction about the pivot point P2 of the neck 22n. This brings the flat of the first wedging tooth 22t-2 into contact with the first tooth 32f. Further loading tends to produce compression of both the upper and lower portions of the first tooth 32f. The lower compression is by the flat of the setting tooth 22t-1 and the upper compression is by the flat which trails the head tooth 23t. Simultaneously the pivot P2 floats downwardly and towards the front of the head 20. When the loading action is completed, the first wedging tooth 22t-2 is locked into the web of the strap 30 and the second wedging tooth 22t-3 is locked into the web following the succeeding tooth, while the setting tooth 22t-1 becomes slightly disengaged from the strap. The wedging action of the wedging pawl teeth 22t-2 and 22t-3 also produce a corresponding wedging action of the locking tooth 23t in the upper portion of the web 32w. In the usual wedging situation, the pawl 20 has a position similar to that indicated in FIG. 5C, with the trailing edge surface 27 of the pawl (forming the trailing surface of the wedging tooth 22t-2) occupying a position that is substantially perpendicular to the axis of insertion of the strap. The setting tooth 22t-1 also tends to be in alignment with the locking tooth 23t. If there is an appreciable increase in reverse thrust (due to an unusually heavy load) the pawl 20 continues its counterclockwise rotation and the wedging action of the teeth 22t-2 and 22t-3 is accentuated. The gap 29 between the front of the pawl and the neck 22n tends to be reduced until it is eliminated.

The setting, wedging and locking functions of the teeth 22t-1 and 22t-2 on the pawl 22 and the tooth 23t in the head 20 are clearly evident from FIGS. 5A–5C, particularly 5C. As seen in FIG. 5C the setting tooth 22t-1 serves for the proper positioning of the strap 30 against the locking tooth 23t in the upper wall 23-2 of the head 20. In addition the wedging teeth 22t-2 and 22t-3 assure the proper locking action of the strap against the head by biting into the web 32w and acting with the flat of the pawl to force an upper tooth 32f against the locking tooth 23t. The teeth 22t-2 and 22t-3 bite into wedge portions 32w as opposed to engaging a tooth 32f because of the non-complementary tooth spacing previously discussed.

The setting, wedging and locking actions are particularly important in the case of a stretched strap. The stretching operation controls the profile of the teeth 32-1 and 32-2 and forms them to facilitate proper positioning of the strap in the head. In addition the stretching operation lengthens the web 32w and increases its tensile strength so that the wedging teeth 22t-2 and 22t-3 promote the locking of the strap in the head by contact of the web as shown in FIG. 5C. Finally, the stretching substantially reduces the thickness of the web so that a preferred configuration is achieved wherein the web has a substantially uniform thickness, extends substantially uniformly between adjacent teeth, and is narrower than the maximum height of a tooth.

It is to be noted that the locking action of the tooth 23t in the upper wall of the head 20, and of the teeth 22t-1, 22t-2 and 22t-3 in the upper surface of the pawl 22, are merely advantageous and not necessary for suitable operation of the harnessing device. With any or all of the teeth 23t, 22t-1, 22t-2 and 22t-3 eliminated the pawl 22 still produces a wedging action by virtue of its forcing the upper surfaces of the teeth 32-2 against the wall surface 23-2. There is a similar wedging against the upper face of the pawl 22.

Figure 6:
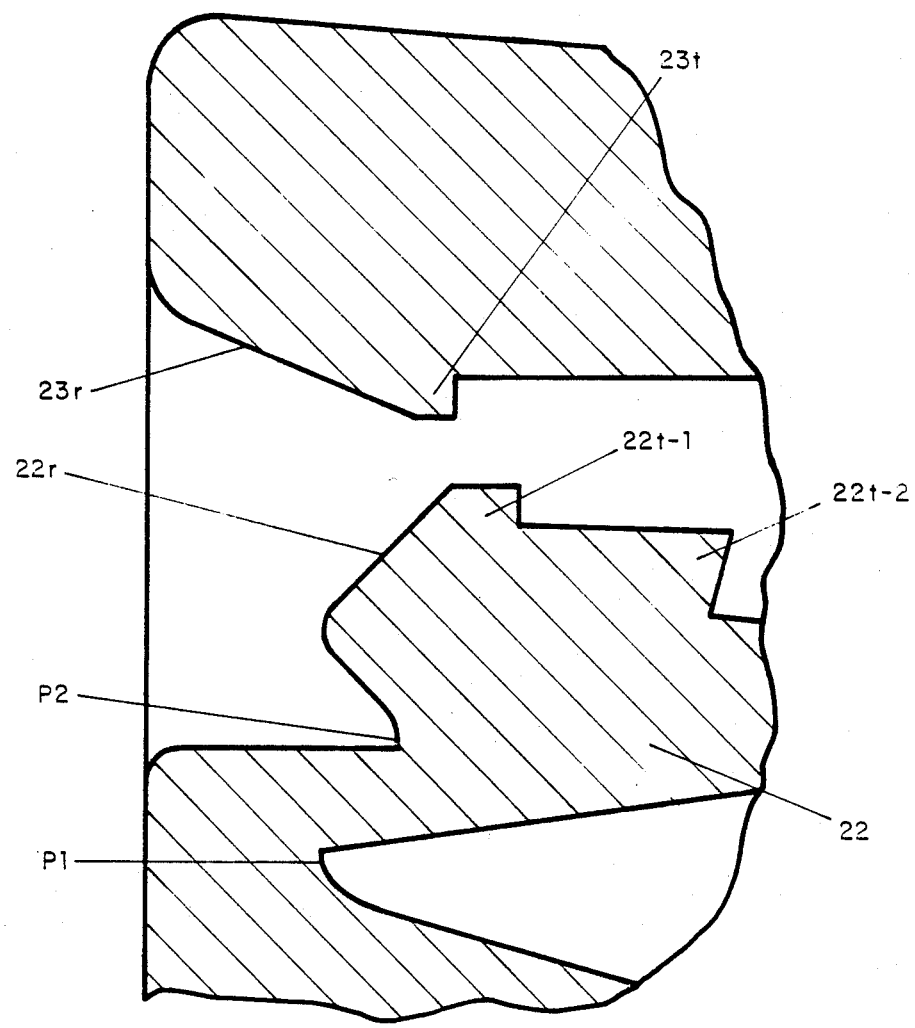
FIG. 6 is an enlarged cross sectional view of a portion of the head of the strap shown in FIGS. 1A, 2A, 3 and 5A through 5C showing constructional details for the interrelationship among the head tooth, the pawl setting tooth, the pawl wedging teeth, and the pivots for the hinged neck of the pawl.

A particularly advantageous configuration of the pawl 22 with respect to the head 20 is shown in detail in FIG. 6. The setting tooth 22t-1 has a ramp surface 22r which desirably forms an angle of about 45° with respect to the axis of insertion I for the strap. The flat associated with the second tooth 22t-2 is substantially parallel with the axis of insertion I and is desirably at a slight angle of declination on the order of $\frac{1}{4}$°. The angle formed by the trailing edge for the first setting tooth 22t-2 is on the order of 80° with respect to the axis of insertion. The flat associated with the second setting tooth 22t-3 has an angle of declination on the order of 4° and the angle formed by the trailing surface of on the order of 30°. The pivot point P1 which is operative as the strap is inserted lies at the intersection of a rectilinear segment forming an angle of approximately 8° with respect to the axis of insertion and a radius of curvature which extends to a line segment positioned with an angle of declination of approximately 15°. The floating pivot P2 which comes into operation during loading of the strap (see FIG. 5C) is at the intersection of a flat which is substantially parallel with the axis of insertion I and a circular arc which opens to approximately 45° with respect to the ramp 22r. The knee of the ramp 22r is rounded to provide a suitable loading surface for extreme loading of the strap where maximum reverse thrust is applied. Entry of the strap is facilitated by a downwardly positioned ramp 20r which forms an angle of approximately 15° with respect to the axis of insertion. The flat following the head tooth 23t is desirably at a slight angle of elevation on the order of $\frac{1}{4}$° with respect to the axis of insertion.

It is to be noted further that the head 20 and the pawl 22 are merely exemplary and that a harnessing device with an unstretched strap having the profile shown in FIG. 3 or a stretched strap having a profile like that of FIG. 4 can be used with a wide variety of other locking heads, including locking heads in which the pawl is stationary. Such a pawl can be temporarily deformed by pressure without requiring actual pivotting of the pawl about a neck.

In providing the harnessing device of FIG. 1, the unstretched device of FIG. 2 is molded of stretch orientable material, such as nylon, polypropylene, polyurethane and the like. The teeth, strap and side rails are proportioned to permit subsequent stretching, which takes place by applying stretching stress between the tip 33 and the head 20 along the major axis of the strap. The results are the controlled tooth profile strap of FIGS. 1 and 4.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:
1. A harnessing device comprising
a locking head having a channel therethrough,
a pawl positioned in said channel,
a strap attached to said head, and
said pawl being connected in said channel to said locking head by a hinged neck which is proportioned to have a prescribed pivot position and resist deformation during rotation of said pawl by said strap in said channel;

said pivot position being fixed for the rotation of said pawl when said strap is inserted into said channel.

2. A harnessing device as defined in claim 1 wherein said strap has a first set of teeth and a second set of teeth and the teeth of said first set are stretched differently than said teeth of said second set.

3. A harnessing device as defined in claim 2 wherein the teeth of said first set are at the commencement of the toothed portion of said strap.

4. A harnessing device as defined in claim 1 wherein said strap and said pawl have teeth and the pitch of the teeth on said pawl is different than the pitch of the teeth on said strap.

5. A harnessing device as defined in claim 4 wherein the pitch of the teeth on said strap is less than the pitch of the teeth on said pawl.

6. A harnessing device as defined in claim 1 wherein said strap and said pawl have teeth and the teeth of said strap have curvilinear apexes and the teeth of said pawl have pointed apexes.

7. A harnessing device as defined in claim 1 wherein said strap has teeth with a profile which s controlled by stretching.

8. A harnessing device as defined in claim 1 wherein said strap has teeth and at least one tooth of said strap is partially compressed by said pawl when said strap is subjected to loading.

9. A harnessing device as defined in claim 1 wherein said strap has teeth and at least one tooth of said strap is partially compressed by said locking head when said strap is subjected to loading.

10. A harnessing device as defined in claim 1 wherein said strap has teeth joined by a web.

11. A harnessing device as defined in claim 1 wherein said pivot position floats when said pawl pivots thereabout during the loading of said strap.

12. A harnessing device as defined in claim 1 wherein said pivot position is formed by the intersection of a linear segment and a curvilinear segment thereby to provide a prescribed position for said pivot.

13. A harnessing device as defined in claim 1 including an additional pivot position for said pawl.

14. A harnessing device as defined in claim 1 wherein said strap contains on at least one side thereof, two different sets of teeth, the first set having a plurality of teeth with a variable pitch and the second set having a plurality of teeth with substantially uniform pitch.

15. A harnessing device as defined in claim 1 wherein said strap contains, on at least one side thereof, two different sets of teeth, with the intertooth interval of the first set being different that the intertooth interval of the second set.

16. A harnessing device as defined in claim 1 wherein said pawl contains a plurality of teeth having a first profile and said strap containing a plurality of teeth having a second profile, with the pitch of the teeth on said strap being different than that of the pitch on said pawl.

* * * * *